United States Patent
Wang

(10) Patent No.: US 6,218,052 B1
(45) Date of Patent: Apr. 17, 2001

(54) ELECTROLYTE SOLUTION OF HIGH-CAPACITY STORAGE BATTERY AND PRODUCING METHOD THEREOF

(76) Inventor: Wanxi Wang, 5 A, No. 2552, Deshengmenyai Xi Da Jie, Haidian District, Beijing (CN)

( * ) Notice: Subject to any disclaimer, the term of this patent is extended or adjusted under 35 U.S.C. 154(b) by 0 days.

(21) Appl. No.: 09/202,103
(22) PCT Filed: Jun. 19, 1996
(86) PCT No.: PCT/CN96/00044
  § 371 Date: Jul. 7, 1999
  § 102(e) Date: Jul. 7, 1999
(87) PCT Pub. No.: WO97/49139
  PCT Pub. Date: Dec. 24, 1997
(51) Int. Cl.[7] ................................................. H01M 10/10
(52) U.S. Cl. .......................... 429/302; 429/225; 429/204; 429/205
(58) Field of Search .................................. 429/204, 205, 429/225, 302; 252/62.2

(56) References Cited

U.S. PATENT DOCUMENTS

| | | | |
|---|---|---|---|
| 3,751,304 | * 8/1973 | Biddick et al. | 136/158 |
| 5,738,956 | * 4/1998 | Komoda | 429/198 |
| 5,780,183 | * 7/1998 | Komoda | 429/198 |

FOREIGN PATENT DOCUMENTS

| | | | |
|---|---|---|---|
| 1049427A | 2/1991 | (CN) . | |
| 1056019 | 11/1991 | (CN) . | |
| 0669676 | 8/1995 | (EP) . | |
| 1-186572 | * 7/1989 | (JP) | H01M/10/06 |

OTHER PUBLICATIONS

Yuhua, L., International Search Report, Mar. 6, 1997, pp. 1–2.
Abstract of CN 1093495 A, Liu et al., Oct. 1994.*
Meissner, J. Power Sources, vol. 67, Issue 1–2, pp. 135–150, Jul. 1997.*

* cited by examiner

Primary Examiner—Carol Chaney
(74) Attorney, Agent, or Firm—Jenkens & Gilchrist, P.C.

(57) ABSTRACT

The invention provides an electrolyte solution, a producing method thereof, and a method for producing high-capacity lead-acid storage battery. The electrolyte is composed of ET-90 stabilizator (1.5–9.6%), nickel sulphate (0.005–0.04%), cobalt sulphate (0.003–0.025%), aluminium sulphate (2–4.8%), sodium sulphate (1.3–3.7%), aluminium phosphate (2–6.3%), lithium iodide (0.090–0.3%), colloidal silicon dioxide (silica gel) (17.6–24%), lithium chloride (0.09–0.31%), lithium carbonate (1.3–5%), magnesium sulphate (1.2–5.9%), sulfuric acid (analytically pure) (7–11.6%), and pure water (39–60%)

14 Claims, 1 Drawing Sheet

Figure 1:
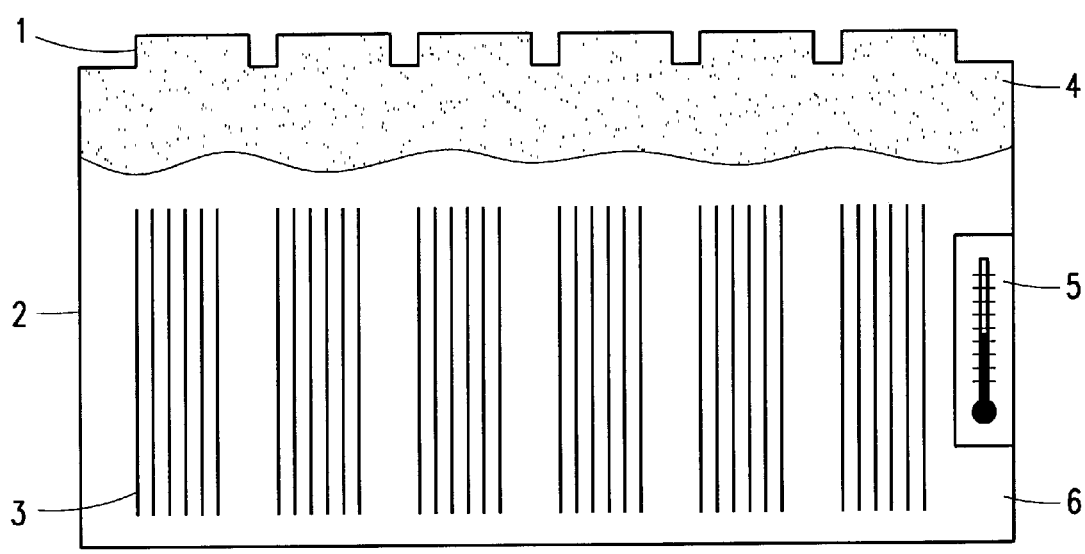

ELECTROLYTE SOLUTION OF HIGH-CAPACITY STORAGE BATTERY AND PRODUCING METHOD THEREOF

TECHNICAL FIELD OF THE INVENTION

The present invention relates to a battery electrolyte and a method for producing the same, more particularly, to a high-energy lead-acid storage battery electrolyte and a method for producing said battery electrolyte.

BACKGROUND OF THE INVENTION

In a common lead-acid storage battery, generally, anode is made of lead dioxide and cathode is made of lead, and the battery electrolyte is a sulfuric acid electrolyte. When connected with an external load, the battery will discharge to generate an electrical current; the reactions on electrodes are as follows:

Anode: $PbO_2 + SO_4^{2-} 31\ 4H^+ 2e \rightarrow PbO_4 + 2H_2O$

Cathode: $Pb + SO_4^{2-} \rightarrow PbSO_4 + 2e$

Thus, lead dioxide on the anode is converted to lead sulfate, and lead on the cathode is also converted to lead sulfate. Once lead sulfate is formed, it will adhere to electrodes because of its extreme insolubility. The total chemical reaction of the discharging process is:

$Pb + 2H_2SO_4 + PbO_2 \rightarrow 2PbSO_4 + 2H_2O$

The voltage of a single cell of the battery is 2.04V. During discharging, the amount of sulfuric acid in the battery electrolyte decreases, and the amount of water increases.

When connected with an external power source, the battery is charged, the electric current passes through the battery backward, the reactions on the two electrodes are carried out just in a reverse direction to that when discharging, lead and lead dioxide are formed by the reaction of lead sulfate on the anode and cathode respectively, and adhere to their respective electrodes, and water is absorbed. The battery comes back to its initial state. The chemical reaction is taken place as follows:

$2PbSO_4 + 2H_2O \rightarrow Pb + 2H_2SO_4 + PbO_2$

The water is electrolyzed simultaneously while the battery is charged, as a result, the water is electrolyzed to hydrogen and oxygen which are then released. The following reactions are taken place:

Anode: $4OH^- \rightarrow 2H_2O + O_2 + 4e$

Cathode: $2H^+ + 2e \rightarrow H_2$

The extent of such reactions depends upon the conditions of charging. The reactions would be enhanced when charging is about to complete.

Thus, water must be added frequently during the electrolyzing process in order to make up for the consumption of water, and charging must proceed with caution to prevent hydrogen released in battery from burning and explosion in the air.

At present, the colloidal electrolyte in a lead-acid storage battery is generally prepared by mixing a sodium silicate solution with a sulfuric acid solution. This electrolyte is convenient for use, maintenance, storage and transport, as it is in a colloid state and hardly flows. In addition, the colloidal electrolyte can protect the active subatance from stripping away from electrodes, thus the service life of the battery can be prolonged for more than 20%. However, the internal resistance of a colloidal electrolyte is higher than that of a sulfuric acid electrolyte, thus, the internal resistance of this storage battery is increased and the capacity is reduced.

Swiss Patent No.391807 discloses a lead-acid storage battery with thixtropic colloidal electrolyte. Chinese Patent Application under publication No. 1056019 also discloses a high-capacity colloidal electrolyte and a method for producing the same. Though the colloidal electrolyte and the lead-acid storage battery having a colloidal electrolyte can reduce solution evaporation, percolation and corrosion, to the technical problems in lead-acid storage battery have not been solved completely, and the capacity has not been increased.

SUMMARY OF THE INVENTION

An object of the present invention is to provide a high-energy lead-acid storage battery electrolyte, which is not only safe and reliable in use, is but also nonpollution to the environment, effective to inhibit gas forming, and can prevent the battery electrode plates from sulphurization, and prolong the battery service life and, more importantly, increase the capacity of lead-acid storage battery by about 30~100%.

The electrolyte according to the present invention comprises mainly the following raw materials as components(by weight):

| | |
|---|---|
| ET-90 stabilizer | 1.5 ~ 9.6% |
| Nickel sulfate | 0.005 ~ 0.04% |
| Cobalt sulfate | 0.003 ~ 0.025% |
| Aluminium sulfate | 2 ~ 4.8% |
| Sodium sulfate | 1.3 ~ 3.7% |
| Aluminium phosphate | 2 ~ 6.3% |
| Lithium iodide | 0.09 ~ 0.3% |
| Colloidal silica (silica sol) | 17.6 ~ 24% |
| Lithium chloride | 0.09 ~ 0.31% |
| Lithium carbonate | 1.3 ~ 5% |
| Magnesium sulfate | 1.2 ~ 5.9% |
| Sulfuric acid (A.R grade) | 7 ~ 11.6% |
| Pure water | 39 ~ 60% | wherein said ET-90 comprises:

| | |
|---|---|
| High purity water | 82 ~ 91% |
| Sodium silicate (A.R. grade) | 7 ~ 10% |
| Sodium sulfate | 2 ~ 8% |

The preferred proportioning of said components in the electrolyte is as follows:

| | |
|---|---|
| ET-90 stabilizer | 2 ~ 8% |
| Nickel sulfate | 0.017 ~ 0.02% |
| Cobalt sulfate | 0.005 ~ 0.01% |
| Aluminium sulfate | 3 ~ 4% |
| Sodium sulfate | 2 ~ 3% |
| Aluminium phosphate | 4 ~ 4.5% |
| Lithium iodide | 0.15 ~ 0.2% |
| Colloidal silica (silica sol) | 19.5 ~ 20% |
| Lithium chloride | 0.15 ~ 0.2% |
| Lithium carbonate | 2.5 ~ 3% |

-continued

| | |
|---|---|
| Magnesium sulfate | 3 ~ 5% |
| Sulfuric acid (A.R grade) | 9.5 ~ 10% |
| Pure water | 47.9 ~ 52.7% |

Another object of the invention is to provide a method for producing a high-energy lead-acid storage battery electrolyte (hereinafter referred to as type high-energy battery electrolyte) which can be obtained by using a given ratio of the raw materials stated above according to the following steps:

a). preparing a high polymer catalyst which is formed by diluting nickel sulfate, cobalt sulfate, aluminium sulfate, sodium sulfate, aluminium phosphate, lithium iodide, lithium carbonate, magnesium sulfate and lithium chloride with high-purity water respectively to a specific weight of 1.015~1.04, letting them touch, mix, dissolve and carry out reactions by stirring till the resulting mixture being emulsified;

b). diluting the silica sol with high-purity water to a specific weight of 1.015~1.04;

c). passing the obtained solution in step b) through a cationic exchange column, from where the pH becomes 3–4; an anionic exchange column, from where the pH becomes 7–8; and a mixed anionic and cationic resin exchange column, then entering into a reactor, adjusting the pH value of the obtained solution to pH=8~14 with ET-90 stabilizer to reach a specific weight of 1.01~1.09 at room temperature, and then concentrating the resulting solution;

d). heating the obtained solution in step c) to a temperature of 70~80° C., then adding sulfuric acid (A.R. grade) into it with stirring;

e). adding the high polymer catalyst to said solution, dissolving it by touching, stirring and mixing the resulting mixture homogeneously, then heating the reactor, emulsifying the solution by introducing an emulsifier to form a paste, thereby obtaining a high-energy storage battery electrolyte.

A further object of the invention is to provide a method for producing a high-energy lead-acid storage battery (hereinafter referred to as a high-energy battery), which can be obtained by adding said battery electrolyte according to the present invention to a dry-state battery according to the following steps:

a). soaking a new dry-state lead-acid storage battery in pure water to let its electrode plates fully absorb water till saturated;

b). pouring out the pure water from the battery, then adding immediately the battery electrolyte prepared according to the present invention;

c). discharging the battery with its corresponding load to reduce the voltage of the battery to less than 6V, thereby forming a high-energy battery.

Further another object of the present invention is to provide a high-energy lead-acid storage battery(hereinafter referred to as a high-energy battery), which has the advantages of high-capacity, compact size and long service life, as well as rapid charging, low charging consumption, and also adaptability to heavy current discharging.

The battery according to the present invention mainly comprises electrode rods, rubber plugs, a shell body, electrode plates, top caps and a high-energy battery electrolyte according to the present invention.

The structure of the battery of the present invention is described in combination with the accompanied drawing below.

BRIEF DESCRIPTION OF THE ACCOMPANIED DRAWING

FIG. 1 is a schematic view of the structure of the high-energy battery according to the present invention.

DETAILED DESCRIPTION OF EXAMPLES OF THE INVENTION

The principle according to the present invention is that the high polymer structure of said high-energy battery electrolyte can heighten the discharging velocity and cause the free ionic reactants to move toward and collide with the high polymer to produce a very high collision frequency and, along with the continuous increase in the amount of high polymers, the catalytic reaction is prompted.

A simplified formulaic representation of the polymer structure of said high-energy battery electrolyte is as follows:

—(H$n$X)—(H$n$X)—(H$n$X)—(H$n$X)—(H$n$X)— wherein n represents the quantity of hydrogen atoms;

X represents the ionic species attached to the polymer backbone of the high-energy battery electrolyte and capable of participation in electrochemical reactions of the electrolyte.

The high-energy battery electrolyte is a very strong electrolyte, when the pH value is very low, "H" in the above-said formula represents a hydrogen ion. If it is a high polymeric electrolyte, the reactions between the electrolyte and the electrode plates will form synthetic products on the surface of electrode plates. The reactions between the ionic species of the high-energy battery electrolyte and the electrode plates are as follows:

Anode: $mPb + X^{n-} \rightarrow Pb_m X + ne$

Cathode: $mPbO_2 + X^{n-} + 2nH^+ + ne \rightarrow Pb_m X + nH_2O$

I.e.,

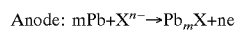
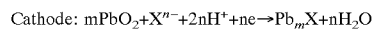
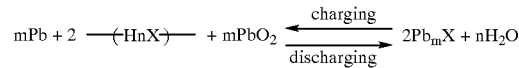

$$mPb + 2 \ \text{—(HnX)—} \ + mPbO_2 \xrightleftharpoons[\text{discharging}]{\text{charging}} 2Pb_m X + nH_2O$$

EXAMPLE 1

In the example 1, the proportioning of various raw materials for producing the 2000 type electrolyte was as follows:

| | |
|---|---|
| ET-90 stabilizer | 4.1%. |
| Nickel sulfate | 0.025% |
| Cobalt sulfate | 0.015%. |
| Aluminum sulfate | 3.1% |
| Sodium sulfate | 2.1% |
| Aluminium phosphate | 5.8% |
| Lithium iodide | 0.1% |
| Colloidal silica (silica sol) | 21.6% |
| Lithium chloride | 0.14% |
| Lithium carbonate | 2.7% |
| Magnesium sulfate | 4.6% |
| Sulfuric acid (A.R grade) | 8.2% |
| Pure water | 47.52% |

EXAMPLE 2

In Example 2, the proportioning of various raw materials for producing the high-energy battery electrolyte was as follows:

| | |
|---|---|
| ET-90 stabilizer | 1.7% |
| Nickel sulfate | 0.02% |
| Cobalt sulfate | 0.01% |
| Aluminium sulfate | 4.2% |
| Sodium sulfate | 1.7% |
| Aluminium phosphate | 4.2% |
| Lithium iodide | 0.18% |
| Colloidal silica (silica sol) | 19.9% |
| Lithium chloride | 0.16% |
| Lithium carbonate | 1.7% |
| Magnesium sulfate | 2.8% |
| Sulfuric acid (A.R grade) | 9.5% |
| Pure water | 53.93% |

EXAMPLE 3

In the example 3, the proportioning of various raw materials for producing the high-energy battery electrolyte was as follows:

| | |
|---|---|
| ET-90 stabilizer | 9.4% |
| Nickel sulfate | 0.035% |
| Cobalt sulfate | 0.005% |
| Aluminium sulfate | 2.3% |
| Sodium sulfate | 2.9% |
| Aluminium phosphate | 3.6% |
| Lithium iodide | 0.22% |
| Colloidal silica (silica sol) | 18.4% |
| Lithium chloride | 0.23% |
| Lithium carbonate | 3.4% |
| Magnesium sulfate | 1.6% |
| Sulfuric acid (A.R grade) | 8.37% |
| Pure water | 49.54% |

EXAMPLE 4

In the example 4, the proportioning of various raw materials for producing the high-energy battery electrolyte was as follows:

| | |
|---|---|
| ET-90 stabilizer | 5.6% |
| Nickel sulfate | 0.009% |
| Cobalt sulfate | 0.021% |
| Aluminium sulfate | 3.4% |
| Sodium sulfate | 3.5% |
| Aluminium phosphate | 2.8% |
| Lithium iodide | 0.29% |
| Colloidal silica (silica sol) | 23.1% |
| Lithium chloride | 0.29% |
| Lithium carbonate | 4.85% |
| Magnesium sulfate | 5.4% |
| Sulfuric acid (A.R. grade) | 11.24% |
| Pure water | 39.5% |

EXAMPLE 5

The high-energy lead-acid storage battery of the present invention can be produced by adding the electrolyte according to the present invention into a conventional dry-state battery.

A typical dry-state battery as shown in FIG. 1 comprises electrode rods and rubber plugs 1, a shell body 2, electrode plates 3 and top caps 4, all of which are known to those skilled in the art. Besides, the storage battery according to the present invention may further include a thermometer 5 for indicating the temperature of the battery electrolyte 6 therein.

Addition of the high-energy battery electrolyte according to the present invention to a dry-state battery as shown in FIG. 1 was carried out according to the following steps:

a). soaking a new dry-state lead-acid storage battery in pure water at normal temperature for about 1 hour to let its electrode plates fully absorb water till saturated;

b). pouring out the pure water from the battery, then adding immediately the battery electrolyte prepared according to the present invention, c). after 3–4 minutes, discharging the battery with its corresponding load to reduce the voltage of the battery to less than 6V, thereby obtaining a high-energy battery;

d). charging the obtained high-energy storage battery at a corresponding current with a high and constant current pulse charger till the temperature rises to 69° C., which indicates that the battery is fully charged.

The battery electrolyte prepared in the above-said examples was added to a dry-state battery, thus a high-energy storage battery was obtained. Comparing it with to the batteries available from market for performance, the results are shown in Table 1 below:

TABLE 1

Comparison between high-energy battery and other batteries on properties

| Battery/Property | Common lead-acid storage battery | high-energy storage battery | Ni/Cd storage battery | Zn/Ag storage battery |
|---|---|---|---|---|
| Energy (kw.h/ton) | 20 ~ 34 (domestic made) 20 ~ 60 (imported) | up to 150 | 20 ~ 30 | 130 ~ 150 |
| Service Life (years) | 1 ~ 1.5 (domestic made) 1 ~ 3 (imported) | 5 times that of common lead-acid storage battery | 3 ~ 4 | 10 ~ 15 |
| Shelf life after filled with electrolyte | 3 months | 10 years | — | — |
| Gas released | large quantity | 10% of that released by common lead-acid storage battery | — | — |
| Daily maintenance and service | needs frequently to adjust acidity and charge | Free of maintenance and service | free of maintenance service | free of maintenance service |
| Charging time, (hr.) | about 10 | about 3 | about 10 | about 10 |
| Discharging at a large current | Unallowable | allowable | allowable | allowable |
| Internal resistance (Ohm) | 0.35 | 0.05 | — | — |
| Self-discharging situation | severe, about 30%/month | 0.4%/month | 15%/month | 15%/month |
| Final voltage (V/single cell) | 1.75 | non | 1.0 | 1.0 |
| Temperature in use (°C.) | >−18 | >−40 | — | — |

Destructive tests were carried out at a one-hour rate for a NX110-5 type of storage battery filled with the electrolyte of high-energy battery according to the present invention and for a NX110-5 type of storage battery filled with a sulfuric acid electrolyte. The results and relative parameters are shown in Table 2 below:

TABLE 2

Results of discharging tests for NX110-5 type of storage battery at a one-hour rate

| electrolyte solution | Voltage non-load (V) | Voltage load (V) | Discharging current under load (A) | Internal resistance of battery (Ohm) | Final voltage (V) | Condition of electrode plate |
|---|---|---|---|---|---|---|
| Sulfuric acid electrolyte | 12.4 | 5.74 | 100 | 0.35 | 10.5 | bending and deformed, scrapped |
| High energy battery electrolyte | 12.67 | 10.85 | 100 | 0.05 | non | in good condition, no change |

From the above tables, it can be seen that said battery electrolyte according to the present invention has the following prominent features:

1). Inhibiting effectively the formation of gas and minimizing hydrogen release so as to prevent the environmental pollution;
2). Being safe and reliable to use, uninflammable and unexplosive;
3). Preventing the electrode plates of the battery from sulphurization, and having a good protective effect on the electrode plates, thus prolonging the service life of battery by a factor of 400% with respect to a sulfuric acid electrolyte;
4). Having a shelf life up to 10 years when it is injected into the battery, and more than 15 years in store;
5). Increasing the energy of a lead-acid storage battery by a factor of 30~150%.

Compared with different types of lead-acid storage batteries of prior art, the storage battery according to the present invention has the following prominent features:

1). Having a high energy up to or over 150 kw.h/ton, which is closed to or even higher than that of a zinc/silver battery;
2). Having compact size, lighter weight and longer service life;
3). Rapid charging, lower charging consumption, and reducing power consumption by about 70%;
4). Suitable for discharging at heavy current, nearly zero internal resistance, and very low self-discharging rate, which is only about 0.4%/month; and
5). Having no final voltage.

The storage battery according to the present invention can not only be used as a power source for electromobiles, but also for igniting, pulling and storing solar energy and as an emergency electric power source and so on.

Though we have described the embodiments according to the present invention in combination with the examples, various modifications and improvements may be made by those having ordinary skill in the art without departing from the spirit and essence of the present invention, but will be still within the scope of the claims appended hereinafter.

What is claimed is:

1. A high-energy lead-acid storage battery electrolyte, comprising the following raw material as components:

| | |
|---|---|
| ET-90 stabilizer | 1.5 ~ 9.6% |
| Nickel sulfate | 0.005 ~ 0.04% |
| Cobalt sulfate | 0.003 ~ 0.025% |
| Aluminium sulfate | 2 ~ 4.8% |
| Sodium sulfate | 1.3 ~ 3.7% |
| Aluminium phosphate | 2 ~ 6.3% |
| Lithium iodide | 0.09 ~ 0.3% |
| Colloidal silica (silica sol) | 17.6 ~ 24% |
| Lithium chloride | 0.09 ~ 0.31% |
| Lithium carbonate | 1.3 ~ 5% |
| Magnesium sulfate | 1.2 ~ 5.9% |
| Sulfuric acid (A.R. grade) | 7 ~ 11.6% |
| Pure water | 39 ~ 60% |

2. A high-energy lead-acid storage battery electrolyte according to claim 1, characterized in that the proportioning of the raw materials used as component in said ET-90 stabilizer is below:

| | |
|---|---|
| High purity water | 82 ~ 91% |
| Sodium silicate (A.R. grade) | 7 ~ 10% |
| Sodium sulfate | 2 ~ 8% |

3. A high-energy lead-acid storage battery electrolyte according to claim 1 or, characterized in that said pure water used has a temperature of 20~40° C., and has a resistivity of $10 \times 10^6 \sim 20 \times 10^6$ Ohm/cm when being fresh.

4. A high-energy lead-acid storage battery electrolyte according to claim 1 or 2, characterized in that it comprises the following raw materials as component:

| | |
|---|---|
| ET-90 stabilizer | 2 ~ 8% |
| Nickel sulfate | 0.017 ~ 0.02% |
| Cobalt sulfate | 0.005 ~ 0.01% |
| Aluminium sulfate | 3 ~ 4% |
| Sodium sulfate | 2 ~ 3% |
| Aluminium phosphate | 4 ~ 4.5% |
| Lithium iodide | 0.15 ~ 0.2% |
| Colloidal silica (silica sol) | 19.5 ~ 20% |
| Lithium chloride | 0.15 ~ 0.2% |
| Lithium carbonate | 2.5 ~ 3% |
| Magnesium sulfate | 3 ~ 5% |
| Sulfuric acid (A.R grade) | 9.5 ~ 10% |
| Pure water | 47.9 ~ 52.7% |

5. A high-energy lead-acid storage battery electrolyte according to claim 4, characterized in that said pure water used has a temperature of 20~40° C., and has a resistivity of $10 \times 10^6 \sim 20 \times 10^6$ Ohm/cm when being fresh.

6. A method for producing a high-energy lead-acid storage battery electrolyte, characterized in that it comprises the following steps:

a). preparing a high polymer catalyst by diluting nickel sulfate, cobalt sulfate, aluminum sulfate, sodium sulfate, aluminum phosphate, lithium iodide, lithium carbonate, magnesium sulfate and lithium chloride with high-purity water respectively, letting them touch, mix, and dissolve by stirring, till the resulting mixture being emulsified;

b). diluting silica sol with high-purity water to reach a specific weight of 1.015~1.04;

c). passing the obtained solution in step b) through a cationic exchange column, an anionic exchange column, and a mixed anionic and cationic resin exchange column, then entering into a reactor, adjusting the pH value of the obtained solution to pH=8~14 with ET-90 stabilizer, and then concentrating the resulting solution;

d). heating the obtained solution in step c) to a temperature of 70~80° C., then adding sulfuric acid (A.R. grade) into it with stirring;

e). adding the high polymer catalyst to the above-said solution, dissolving by sufficiently touching and mixing by homogeneously stirring the resulting mixture, then heating the reactor, emulsifying the solution by introducing a emulsifier to form a paste, thereby obtaining the high-energy battery electrolyte.

7. A method for producing the high-energy lead-acid storage battery electrolyte according to claim 6, characterized in that in said step a), nickel sulfate, cobalt sulfate, aluminum sulfate, sodium sulfate, aluminum phosphate, lithium iodide, lithium carbonate, magnesium sulfate and lithium chloride are diluted with high-purity water respectively to reach a specific weight of 1.015~1.04; then are dissolved by sufficiently touching and mixing by homogeneously stirring and continuously stirring till the resulting mixture being emulsified to give a high polymer catalyst.

8. A method for producing the high-energy lead-acid storage battery electrolyte according to claim 6 or 7, characterized in that in said step c), said solution is passed in series through a cationic exchange column, from where the pH becomes 3~4; an anionic exchange column, from where the pH becomes 7~8; and a mixed anionic and cationic resin exchange column, and then introduced into a reactor, where the pH value of the resulting solution is adjusted to 8~14 with ET-90 stabilizer, and then the resulting solution is concentrated to reach a specific weight of 1.01~1.09 at room temperature.

9. A method for producing the high-energy lead-acid storage battery electrolyte according to claim 8, characterized in that in said step c), said solution is passed through a cationic exchange column, from where the pH becomes 3~4; an anionic exchange column, from where the pH becomes 7~8; and a mixed anionic and cationic resin exchange column, then introduced into a reactor, where the pH value of the resulting solution is adjusted to 9~11 with ET-90 stabilizer, and then the resulting solution is concentrated to reach a specific weight of 1.03~1.05 at room temperature.

10. A method for producing a high-energy lead-acid storage battery, characterized in that it comprises the following steps:

a). soaking a new dry-state lead-acid storage battery in pure water to make its electrode plates filly absorb water till saturated;

b). pouring out the pure water from the battery, then adding immediately the battery electrolyte prepared according to claim 6;

c). discharging the battery with its corresponding load to reduce the voltage of the battery to less than 6V, thereby forming a high-energy battery.

11. A method for producing a high-energy lead-acid storage battery according to claim 10, characterized in that in said step a), a new dry-state lead-acid storage battery is added into pure water having a temperature of about 20~45° C., soaking therein for about 1 hour to let its electrode plates absorb water molecules fully till saturation; and in step c), 3~4 minutes later after step b), the battery is discharged with its corresponding load to reduce the voltage of the battery to less than 6V, thereby a high-energy battery is formed.

12. A method for producing a high-energy lead-acid storage battery according to claim 10 or 11, characterized in that it further comprises a step:

d). charging the obtained high-energy storage battery at a suitable current with a high and constant current pulse charger till the temperature rises to 69° C., which indicates the battery is fully charged.

13. A high-energy lead-acid storage battery comprising electrode rods, rubber plugs, a shell body, electrode plates and top caps, characterized in that it further comprises a high-energy lead-acid storage battery electrolyte according to claim 1.

14. A high-energy lead-acid storage battery according to claim 13, characterized in that it further comprises a thermometer for measuring the temperature of the electrolyte in said high-energy lead-acid storage battery.

* * * * *

UNITED STATES PATENT AND TRADEMARK OFFICE
CERTIFICATE OF CORRECTION

PATENT NO. : 6,218,052 B1
DATED : April 17, 2001
INVENTOR(S) : Wanxi Wang

Page 1 of 1

It is certified that error appears in the above-identified patent and that said Letters Patent is hereby corrected as shown below:

Column 1,
Line 25, replace "adiere" with -- adhere --

Column 10,
Line 7, replace "filly" with -- fully --

Signed and Sealed this

Sixteenth Day of April, 2002

Attest:

JAMES E. ROGAN
Director of the United States Patent and Trademark Office

Attesting Officer